United States Patent [19]

Sattel

[11] 4,432,589

[45] Feb. 21, 1984

[54] MOBILE STORAGE APPARATUS WITH CANTILEVERED LIGHT FIXTURES

[75] Inventor: John A. Sattel, Janesville, Wis.

[73] Assignee: Spacesaver Corporation, Fort Atkinson, Wis.

[21] Appl. No.: 307,400

[22] Filed: Oct. 1, 1981

[51] Int. Cl.[3] ........................ A47B 53/00; B60M 1/34

[52] U.S. Cl. .................................... 312/198; 312/199; 312/201; 312/223; 108/23; 362/396

[58] Field of Search ............... 312/223, 198, 199, 201; 108/23; 362/396

[56] References Cited

U.S. PATENT DOCUMENTS

| | | | |
|---|---|---|---|
| 139,419 | 5/1873 | Payne | 312/223 |
| 335,503 | 2/1886 | Butler | 362/396 |
| 1,229,458 | 6/1917 | Hinsdill | 108/23 |
| 1,568,729 | 1/1926 | Gearon | 312/223 |
| 2,151,259 | 3/1939 | Young | 312/223 |
| 2,553,794 | 5/1951 | Staten, Jr. | 312/223 |
| 2,800,573 | 7/1957 | Hudson | 362/396 |
| 2,812,988 | 11/1957 | Kohl | 312/223 |
| 3,640,595 | 2/1972 | Staller et al. | 312/198 |
| 3,829,189 | 8/1974 | Staller | 312/198 |
| 3,865,446 | 2/1975 | Mastronardi | 312/201 |

*Primary Examiner*—Victor N. Sakran
*Attorney, Agent, or Firm*—Henry C. Fuller

[57] ABSTRACT

Mobile storage apparatus which includes a plurality of carriages carrying shelving which are movable on a track system to open up an isle to provide access to adjacent faces includes cantilevered light fixtures which are supported from the top of the units and which extend outwardly over adjacent units so that when units are separated to open an aisle the light fixture is located above the aisle to illuminate the storage faces of the shelving. Mounting brackets are positioned on the tops of the shelving so that the light fixture from one unit will not interfere with the mounting bracket on an adjacent unit when the units are closed.

3 Claims, 4 Drawing Figures

MOBILE STORAGE APPARATUS WITH CANTILEVERED LIGHT FIXTURES

BACKGROUND OF THE INVENTION

Mobile shelving apparatus such as that disclosed in U.S. Pat. Nos. 3,640,595 and 3,829,189 employ some type of track system to support carriages with shelving for movement in a desired direction to open up a selected aisle space for access. In the past systems of this type have either employed the building overhead lighting on the ceiling of the storage space or lighting equipment supported on the steel shelving. In this form the lighting fixtures were supported on pairs of pivoted arms pivoted to the adjoining mobile units which operated in a scissors fashion to fold and unfold as the units moved together and apart to open and close a selected aisle space. The scissors arms provided the conduit for the electrical wires. This type of fixture often sagged after an indeterminate period and thus required maintenance.

SUMMARY OF THE INVENTION

The invention provides cantilevered light fixtures in which there are no moving parts to service, thus minimizing the need for replacement or repair. In accordance with the present invention, the cantilevered light assemblies are mounted on brackets which have loops to provide adjustment of the conduits which support the light fixtures in a direction parallel to the path of movement of the units. This adjustment capability enables centering of the light fixtures so that they are centered over the aisle when the units are separated. The supporting brackets are mounted on the tops of the units in offset relationship so that when the units are closed there is no interference between the brackets on one unit and the cantilevered light fixture on the adjacent unit.

Further objects, advantages and features of the invention will become apparent from the following disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
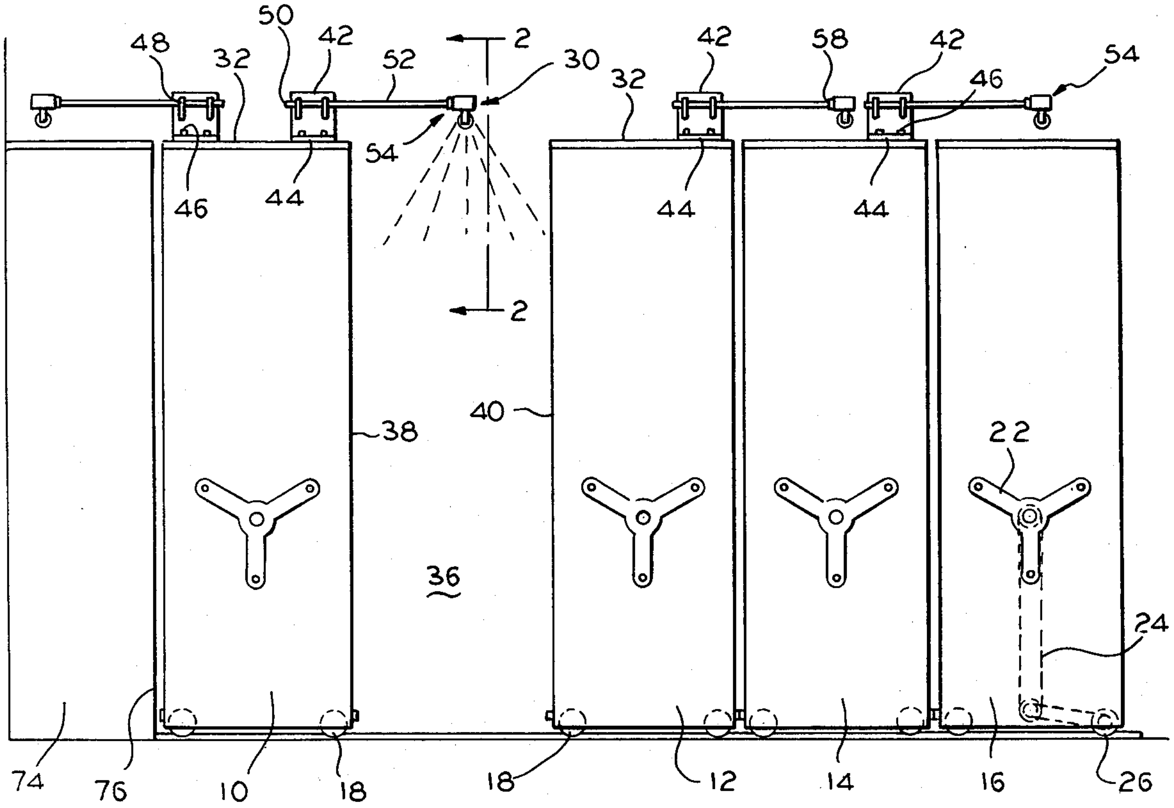
FIG. 1 is a diagrammatic side elevational view of apparatus employing the lighting fixture of the invention.

In the drawings, in FIG. 1 a plurality of mobile shelving units 10, 12, 14 and 16 are shown. These mobile units can employ carriages having wheels supported on rails as disclosed in U.S. Pat. No. 3,640,595, the entire disclosure of which is incorporated herein by reference. The mobile units each have a plurality of wheels 18 at spaced intervals along the length of the units. The mobile units can be powered with an individual electric motor in each unit, as disclosed in patent 3,640,595, or can be provided with a manual crank 22 with a chain drive 24 to the driven wheels 26 (FIG. 1).

In accordance with the invention, there is provided lighting fixtures 30 and support means to adjustably support the lighting fixtures 30 in a cantilevered position from the top 32 of the mobile shelving units so that the light fixture is located or positioned over an aisle 36 during use so that the adjacent faces 38 and 40 of the shelving apparatus are illuminated. In the disclosed construction the support means comprises upstanding brackets 42 which have fastening flanges 44 so that the brackets can be supported by fasteners 46 to the tops 32 of the units. The brackets are provided with clamps 48 which are loop-shaped and adjustably receive the ends 50 of conduit 52.

Figure 2:
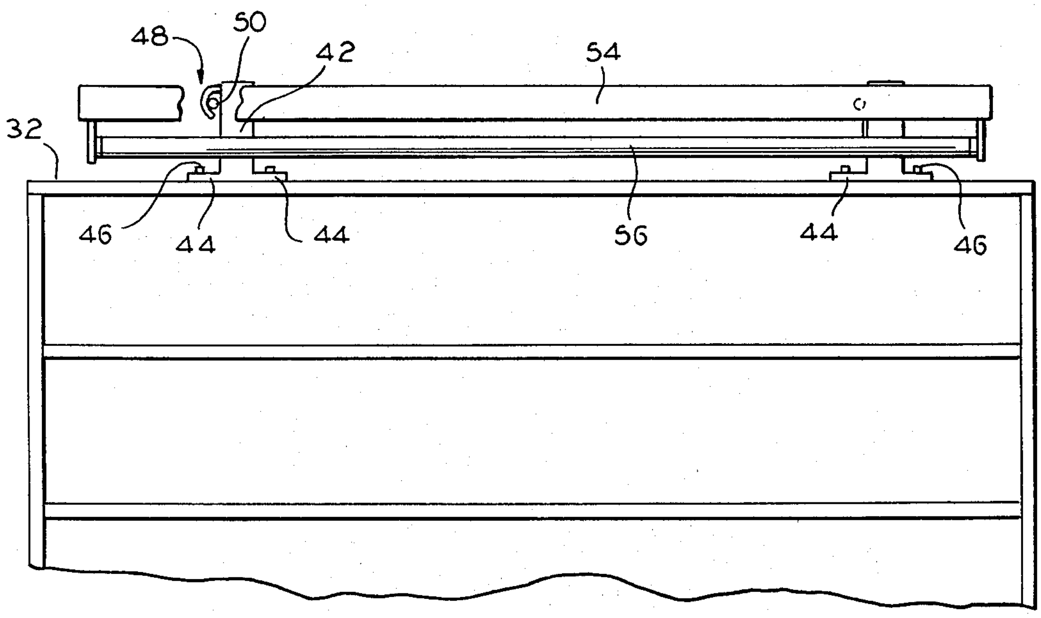
FIG. 2 is an enlarged sectional view along line 2—2 of FIG. 1.

The opposite end of the conduit 52 has a light fixture 54 which, as disclosed, is a fluorescent light fixture with a tube 56 (FIG. 2). The conduits 50 are connected to the fixture with conventionally available conduit fittings 58.

As illustrated in FIG. 1, a light fixture 30 is positioned approximate the center of the aisle 36 when the adjacent units 10 and 12 are opened to form an aisle. When the adjacent units are closed, such as units 12 and 14 in FIG. 1, it is necessary and desirable to position the mounting brackets so that there is no interference between the bracket on one fixture, such as 14, and the light fixture on the unit 12. Accordingly, the mounting brackets are off-set from the center line of the top of a unit, such as the center line 60 illustrated in FIG. 4. The mounting brackets 42 and clamps 48 are also arranged so that the light fixtures are supported above the tops 32 of the storage units so that there is no interference during relative movement of the light fixtures and storage units.

Figure 3:
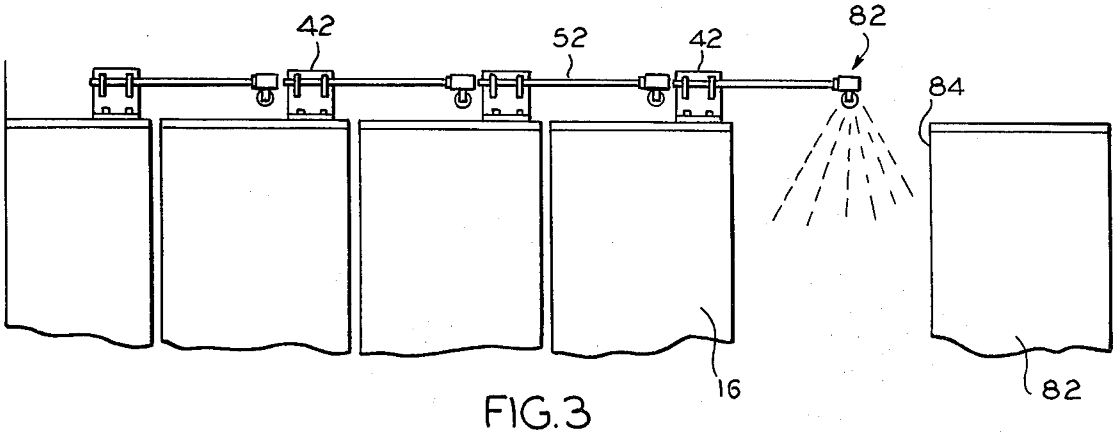
FIG. 3 is a fragmentary side elevational view showing a modified arrangement of the invention.
Figure 4:
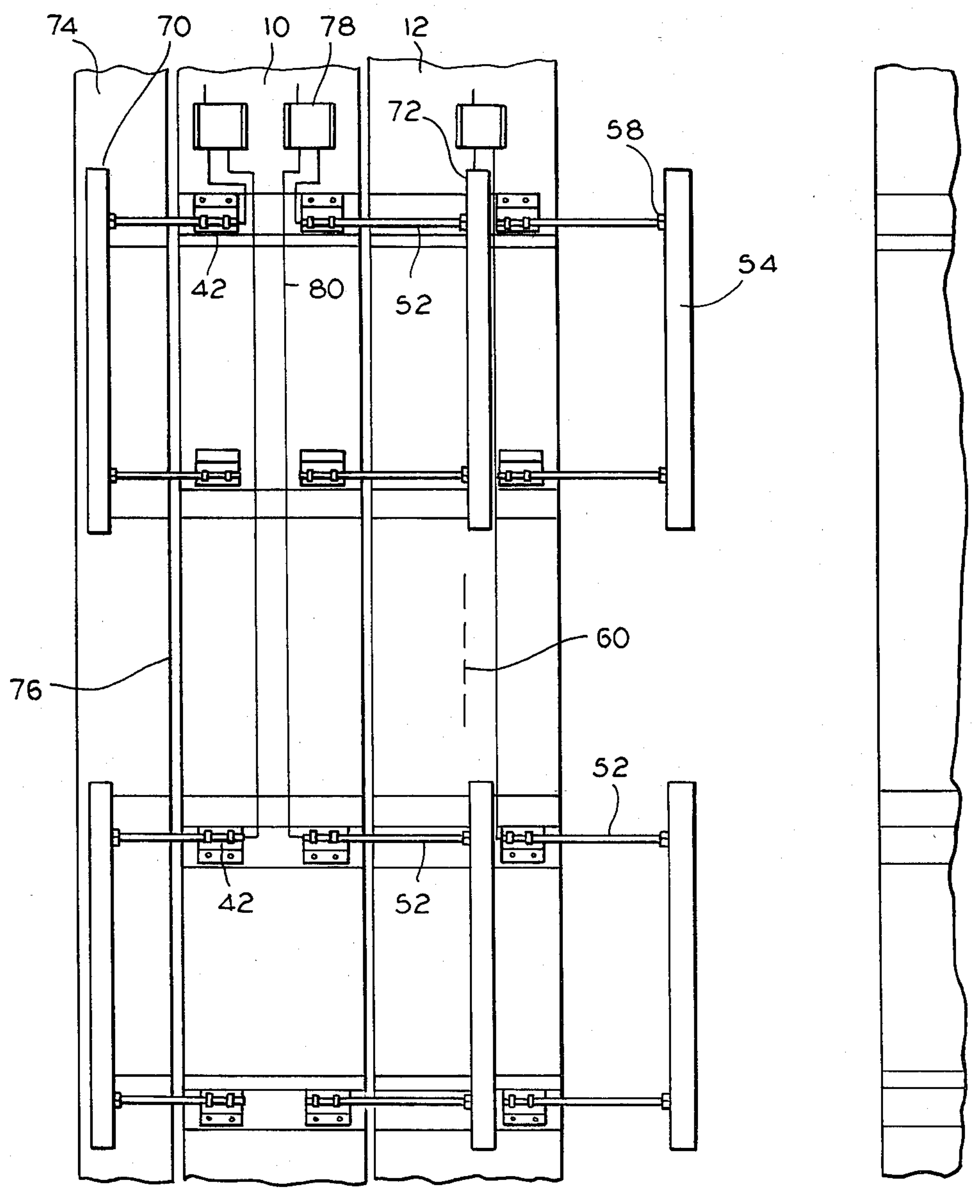
FIG. 4 is a top view of the arrangement shown in FIG. 3.

FIGS. 1 and 4 also show an arrangement in which one unit 7 extends oppositely from the light fixture 72 on unit 10, although both are mounted on the same unit 10. The light fixture 70 provides light for the space between unit 10 and a stationary storage unit 74 with a storage face at 76. In FIG. 3, a stationary unit 82 is at the right of the mobile units. The fixture 82 on a mobile unit will illuminate the face 84 of the stationary unit. Alternatively the fixture 82 could be supported on the end unit 82.

The conduits 52 are connected to junction boxes 78 (FIG. 4) which have outlet cords 80 which can be electrically connected to a circuit actuated by either a safety floor of the type described in patent 3,640,595 or the motor actuation circuit. It is not necessary for the lights to be illuminated when the storage apparatus is not in use.

I claim:

1. In storage apparatus comprising a plurality of mobile storage units, each unit having at least one storage face, and guide means cooperating with said mobile units to guide movement of said storage units in a direction normal to said faces and said storage units being movable to open an aisle between adjacent units for access to said faces, the improvement comprising light fixtures, supporting means adjustably supporting said fixtures on top of said units to position said light fixtures in cantilevered relationship from one unit above an adjacent unit when the units are closed so that there is no interference between the light fixture and the adjacent unit during relative movement of the light fixture and adjacent unit upon opening of an aisle over which said lighting structure extends and so that the light thereon will illuminate the adjoining faces of adjacent units when the units are separated to form an aisle and wherein said light fixtures project a distance from the units upon which they are supported a distance equal to approximately one-half of the distance between units when the units are opened to form an aisle to illuminate both exposed shelf faces, and in which adjacent storage units have lighting fixtures and said lighting fixture from one unit extends over the adjacent unit, with said supporting means being offset from the longitudinal centerline of the mobile units toward the face of the unit to be illuminated by the unit light fixture to provide clearance between the supporting means of one unit and the overhanging lighting fixture of another unit when said units are in closed position.

2. The improvement of claim 1 wherein each of said light fixtures includes two spaced support brackets having support loops and conduit adjustably positioned in said support loops and extending over said aisle, and wherein said lighting fixture is supported between said conduits, and wherein said conduits can be adjusted to position said lighting fixture approximate the center of said aisles when adjacent units are open.

3. The improvement of claim 1 including a stationary storage unit adjacent a mobile unit and wherein said mobile unit supports two oppositely extending light fixtures, with one of said fixtures being located over said stationary unit when said units are closed.

* * * * *